US008949213B2

(12) United States Patent
Jackson

(10) Patent No.: US 8,949,213 B2
(45) Date of Patent: *Feb. 3, 2015

(54) SYSTEM AND METHOD FOR DYNAMICALLY MANAGING DATA CENTRIC SEARCHES

(71) Applicant: Adaptive Computing Enterprises, Inc., Provo, UT (US)

(72) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,257

(22) Filed: Aug. 5, 2013

(65) Prior Publication Data

US 2013/0318122 A1 Nov. 28, 2013

Related U.S. Application Data

(63) Continuation of application No. 12/245,276, filed on Oct. 3, 2008, now Pat. No. 8,504,548.

(51) Int. Cl.
G06F 17/30 (2006.01)

(52) U.S. Cl.
CPC .... *G06F 17/30979* (2013.01); *G06F 17/30899* (2013.01)
USPC ............................ 707/706; 707/716; 707/752

(58) Field of Classification Search
USPC .......................................... 707/706, 716, 752
See application file for complete search history.

(56) References Cited

U.S. PATENT DOCUMENTS 4,819,154 A * 4/1989 Stiffler et al. .................... 714/20
5,813,000 A * 9/1998 Furlani ................................. 1/1
(Continued)

FOREIGN PATENT DOCUMENTS

CN 1934566 3/2007
JP 2002-073651 3/2002
(Continued)

OTHER PUBLICATIONS

Tomonori Takada, et al., "Load Balancing using Prediction for Distributed Video Servers," Journal (3) of Transactions of the 58th (1999 First Semester) National Meeting. Japan. Information Processing Society of Japan, Mar. 9, 1999, 3-245~3-246.

(Continued)

*Primary Examiner* — Noosha Arjomandi

(57) ABSTRACT

Disclosed herein are systems, methods, and computer-readable media for dynamically managing data-centric searches. The method includes identifying an event related to domain-specific searches to a database, identifying data at a first memory location in the database, duplicating the data to a new memory location, and distributing processing more domain-specific searches amongst an expanded search space including the new memory location and the first memory location. The expanded search space can be reduced or collapsed in response to a reduction event by removing duplicate data from the first memory location or the new memory location and adjusting the distribution of processing amongst the remaining memory location. The method can optionally include organizing multiple events by network segment, identifying a network segment associated with domain-specific searches, and duplicating the data to a new memory location in close proximity to the identified network segment.

17 Claims, 5 Drawing Sheets

(56) References Cited

U.S. PATENT DOCUMENTS

| | | | |
|---|---|---|---|
| 6,463,430 B1 * | 10/2002 | Brady et al. | 1/1 |
| 6,463,454 B1 | 10/2002 | Lumelsky et al. | |
| 6,466,980 B1 | 10/2002 | Lumelsky et al. | |
| 6,501,799 B1 * | 12/2002 | Kohn | 375/240.16 |
| 6,879,982 B2 | 4/2005 | Shirasaka | |
| 6,996,551 B2 | 2/2006 | Hellerstein et al. | |
| 7,171,415 B2 | 1/2007 | Kan et al. | |
| 7,194,575 B2 | 3/2007 | Nakanishi et al. | |
| 7,243,100 B2 | 7/2007 | Ma et al. | |
| 7,403,942 B1 | 7/2008 | Bayliss | |
| 7,716,199 B2 * | 5/2010 | Guha | 707/706 |
| 7,788,248 B2 * | 8/2010 | Forstall et al. | 707/706 |
| 2001/0054045 A1 | 12/2001 | Shirasaka | |
| 2002/0107719 A1 * | 8/2002 | Tsang et al. | 705/10 |
| 2002/0120741 A1 | 8/2002 | Webb et al. | |
| 2004/0249836 A1 * | 12/2004 | Reynders et al. | 707/100 |
| 2005/0192937 A1 | 9/2005 | Barsness et al. | |
| 2005/0262317 A1 | 11/2005 | Nakanishi et al. | |
| 2005/0278760 A1 | 12/2005 | Dewar et al. | |
| 2006/0212432 A1 | 9/2006 | Tsai | |
| 2007/0244893 A1 | 10/2007 | Abdat | |
| 2007/0260814 A1 | 11/2007 | Branscome et al. | |
| 2009/0157610 A1 * | 6/2009 | Allen et al. | 707/3 |
| 2009/0198670 A1 | 8/2009 | Shiffer et al. | |
| 2009/0198689 A1 | 8/2009 | Frazier et al. | |

FOREIGN PATENT DOCUMENTS

| | | |
|---|---|---|
| JP | 2005-338893 | 12/2005 |
| JP | 2006-146951 | 6/2006 |
| JP | 2008-186141 | 8/2008 |
| WO | WO 02/91242 | 11/2002 |

OTHER PUBLICATIONS

Jin Chen et al, "Autonomic Provisioning of Backend Databases in Dynamic Content Web Servers," IEEE International Conference on Autonomic Computing, ICAC '06, Dublin, IE, Jun. 13-16, 2006, pp. 231-242, XP031016281, IEEE, Piscataway, NK, US, ISBN: 978-1-4244-0175-8.

Zhou L et al, "Document replication and distribution in extensible geographically distributed web servers," Journal of Parallel and Distributed Computing, vol. 63, No. 10, Oct. 2003, pp. 927-944, XP004464345, Elsevier, Amsterdam, NL, ISSN: 0743-7315, DOI: 10.1016/S0743-7315(03)00095-9.

* cited by examiner

SYSTEM AND METHOD FOR DYNAMICALLY MANAGING DATA CENTRIC SEARCHES

PRIORITY INFORMATION

The present application is a continuation of U.S. patent application Ser. No. 12/245,276, filed Oct. 3, 2008, the content of which is incorporated by reference in its entirety.

CROSS-REFERENCE TO RELATED APPLICATIONS

The present application is related to the following U.S. patent applications: application Ser. No. 10/530,582, filed Aug. 11, 2006 ; application Ser. No. 10/530,581, filed Aug. 11, 2006; application Ser. No. 10/530,577, filed Mar. 11, 2005; application Ser. No. 10/530,576, filed Mar. 11, 2005; application Ser. No. 11/208,138, filed Aug. 19, 2005; application Ser. No. 11/629,940, filed Dec. 18, 2006; application Ser. No. 12/033,386, filed Feb. 19, 2008; application Ser. No. 11/155,090, filed Jun. 17, 2005; application Ser. No. 11/155,347, filed Jun. 17, 2005; application Ser. No. 11/718,867, filed May 8, 2007; application Ser. No. 11/155,091, filed Jun. 17, 2005;application Ser. No. 10/589,339, filed Aug. 11, 2006; application Ser. No. 11/276,852, filed Mar. 16, 2006; application Ser. No. 10/530,578, filed Mar. 11, 2005; application Ser. No. 10/530,580, filed Mar. 11, 2005; application Ser. No. 10/530,575, filed Feb. 4, 2008; application Ser. No. 11/207,438, filed Aug. 26, 2005; application Ser. No. 11/276,013, filed Feb. 9, 2006; application Ser. No. 11/276,853, filed Mar. 16, 2006; application Ser. No. 11/276,854, filed Mar. 16, 2006; application Ser. No. 11/276,855, filed Mar. 16, 2006; application Ser. No. 11/276,856, filed Mar. 16, 2006; application Ser. No. 11/279,007, filed Apr. 7, 2006; application Ser. No. 11/763,010, filed Jun. 14, 2007; application Ser. No. 11/616,156, filed Dec. 26, 2006; application Ser. No. 12/023,722, filed Jan. 31, 2008; and application Ser. No. 12/179,142, filed Jul. 24, 2008 . Each patent application was filed previous to present application. The content of each of these applications is incorporated herein by reference in its entirety.

BACKGROUND OF THE INVENTION

1. Field of the Invention

The present invention relates to searches and more specifically to managing resources to process data centric searches.

2. Introduction

Data centric searches have grown in popularity in the last 15 years. Companies like Yahoo, AltaVista, Ask.com, and Google have risen by providing search services over the World Wide Web. Typically users visit a web page and search for items they wish to find by entering search terms in a text box on a web page. A search engine processes those queries in a large data center containing hundreds, thousands, or even hundreds of thousands of individual computers networked together as a grid or a cluster as a compute environment. A search engine typically distributes the search database across many computers. However, when an event occurs which piques the interest of many Internet users, requests for information about the event can overwhelm search engines in a short period of time. For example, the Beijing 2008 Olympics was an event that drove an enormous amount of web searches, most of which were substantially the same or contained a very similar element. In a typical search engine data center, that means that one computer or a fixed set of computers containing highly sought-after information are repeatedly queried. Such similar queries may be considered within the same domain. The sudden workload increase on that computer or set of computers often leads to a decrease in quality of service. For example, where a server may service a query in 0.02 seconds under normal conditions, the same server may service a query in 0.08 seconds or more under extreme load.

While the Olympics are a predictable example of an event that leads to many spikes in searches, other events are less predictable, for example natural disasters such as hurricanes and earthquakes and unnatural disasters such as political scandals. Whereas searches related to the Olympics are spread out over two weeks or more and search volume gradually increases, other events rapidly spike from being statistically insignificant to occupying a substantial percentage of overall searches in a very short period of time.

In many cases, these high-volume, event-driven searches are the highest value searches (i.e. the most important to users), but because of the close temporal proximity and high volume of requests, the individual servers in the compute environment which contain the necessary data are the least responsive. The net result is that the most important searches receive the worst service.

Data searches as used herein may apply to any kind of data search or data centric transaction. Web searches may involve a search such as a Google search in which the data is indexed data owned by Google and obtained via web crawling algorithms over the Internet. The data searched may be webpages themselves such as where many users access the same webpage like the drudgereport or the CNN websites.

Accordingly, what is needed in the art is an improved way to manage searches such that the most frequent searches are serviced in a timely manner.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for dynamically managing data centric searches. The method includes receiving information associated with an event related to domain-specific searches to a database, identifying data at a first memory location in the database, the data being data identified in response to the domain-specific searches, duplicating the data at least once to at least one new memory location, and distributing more domain-specific searches amongst the at least one new memory location. The method can further distribute processing amongst at least one of the first memory location and the at least one new memory location. The system can distribute processing more domain-specific searches randomly, serially or in other strategic ways, such as geographically, for example. If the number of searches submitted via a search engine for a certain car or political candidate hits a certain threshold such that response time is reduced, the system can perform the steps disclosed herein. After duplicating the data, the system distributes additional searches on the same domain or topic amongst additional memory locations to improve response time.

The method optionally includes using an expanded search space made up of the first memory location and at least one memory location. The method can further include identifying a reduction event related to the domain-specific searches and collapsing the expanded search space by removing duplicate data from one or more memory locations or ceasing to access these memory locations and distributing processing amongst at least one remaining memory location. The method can also include organizing multiple events by network segment, identifying a network segment associated with domain-specific searches, and duplicating the data to at least one new memory location in close proximity to the identified network segment. The method can measure proximity by one or more of geographic distance, network latency, number of intermediate network hops, temperature, and cost. A workload manager such as MOAB® from Cluster Resources or software from Platform Computing can perform or manage all or part of the method.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
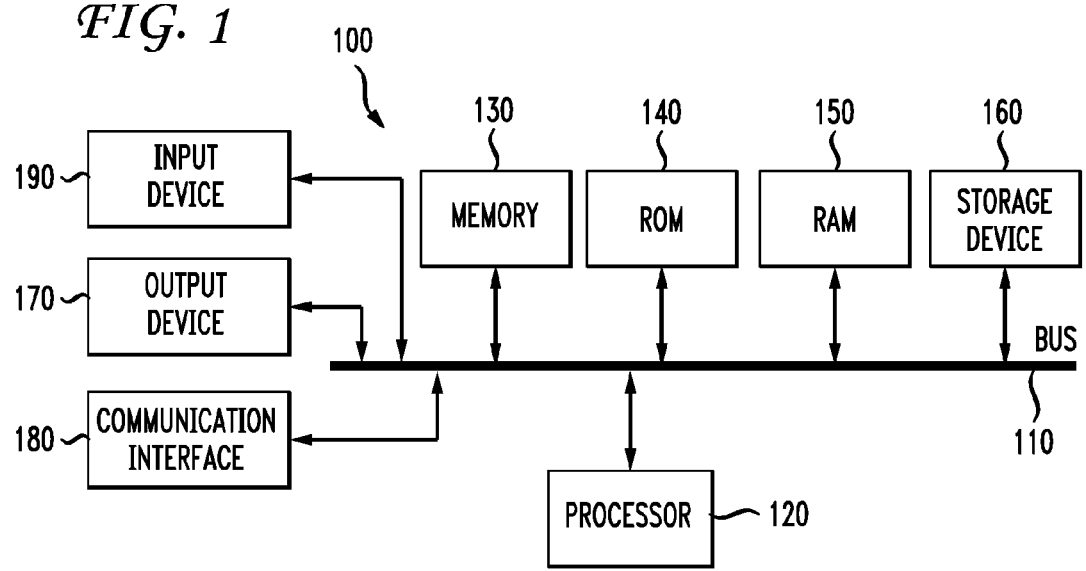
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
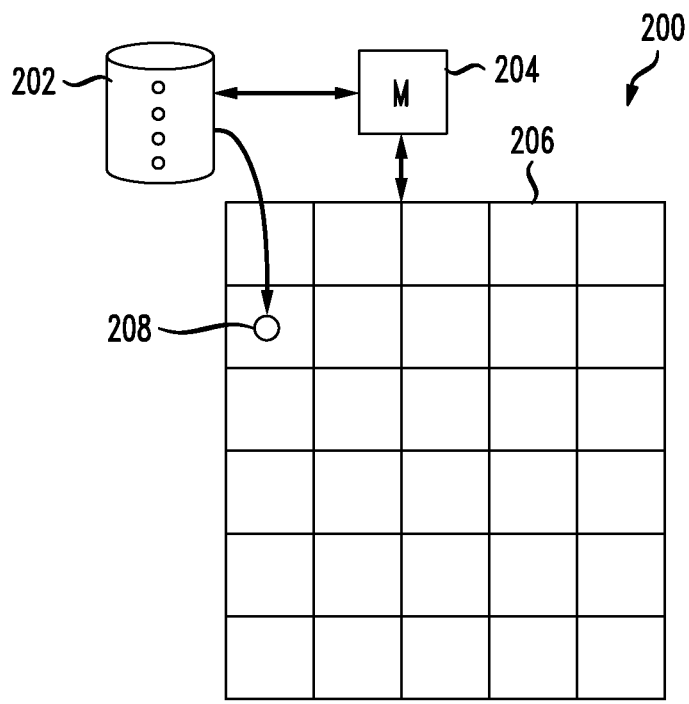
FIG. 2 illustrates a first prior art approach to managing searches.

Having discussed some fundamental system components which can be configured to practice the method, the disclosure turns to several prior art approaches to managing searches. FIG. 2 illustrates a first prior art approach to managing searches. A queue 202 stores tasks or jobs to be submitted into a compute environment to consume resources such as CPU cycles, memory, database access and so forth. As the queue 202 is filled, software such as a workload manager 204, examples of which include MOAB Cluster Suite® or other software from Cluster Resources or Platform, assigns tasks/jobs from the queue 202 to a compute environment 206. In a data centric searching context, the compute environment 206 may contain different portions of a large data set on multiple computers. In one aspect, the workload manager performs such tasks as intelligent scheduling and placement of tasks/jobs (such as search requests) into the compute environment 206, intelligent load balancing and other workload management tasks and capabilities as are disclosed in the various applications incorporated herein by reference. Such software can identify the optional timing and resources to fulfill search requests (jobs) and maps the jobs from the queue to specific compute resources 208 in order to maximize the utilization of the compute environment 206 while fulfilling service level agreements or other metrics. The present disclosure will explain herein how the capabilities of the workload manager 204 can be extended into not only managing the insertion of jobs into a compute environment for consumption of resources but also, in a data-centric context, manage the compute environment to improve the ability of the environment to respond to high volume searches or other events which can reduce performance.

Figure 3:
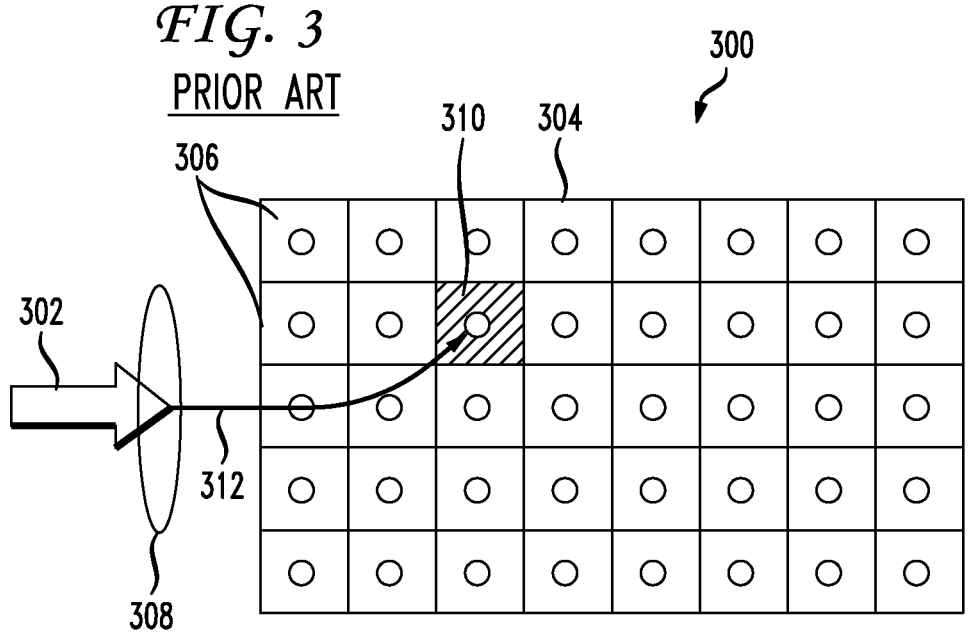
FIG. 3 illustrates a second prior art approach to managing searches.

FIG. 3 illustrates a second prior art approach 300 to managing searches which accepts a series of transactions or requests 302, such as searches, and maps the memory space 304 associated with answering those requests instead of balancing transactions by processor space or by workload. This approach basically divides the large search space 304 evenly and/or strategically across a large number of compute servers and across their disks or memory 306 in order to aid in searching the large search space. Instead of the traditional model where a system has multiple compute systems with data storage and cache, this approach effectively uses the equivalent of numerous data spaces, potentially all in on-processor cache which allows for rapid data access in a data-centric, data-focused way. This prior art approach statically distributes data across nodes 306 in the memory space 304 by disk size, memory size, or data size. This approach includes a translation layer 308 which maps incoming requests 302 to the appropriate compute server(s) or node(s) 306 that happen to have all or part of the dataset required by the incoming request 302. Each time that search or transaction comes in, the system maps it to the correct collection of servers 306 in the memory space 304 through the translation layer 308. This is fundamentally a good model because the data is quickly accessible in memory and the processing aspect of the translation layer is relatively light weight. However, this prior art approach does not adapt and adjust to meet unexpected spikes in a particular set of transactions. In other words, if many users begin searching for data in the same domain or subject matter, then this prior art approach does not adequately handle the increased demand on the compute environment to respond to the searches.

Figure 4:
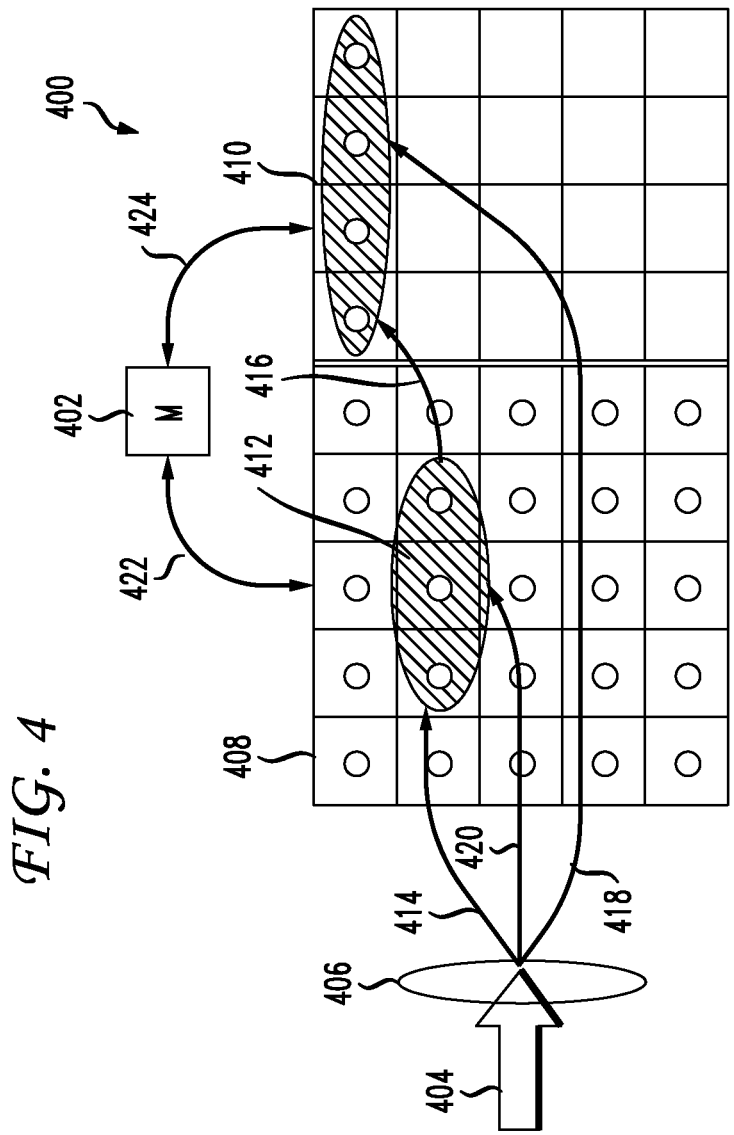
FIG. 4 illustrates an example system embodiment for managing searches.

The disclosure now turns to the invention disclosed herein. The disclosed approach will provide improvements through the capabilities of workload management software. The disclosed approach utilizes the capabilities of workload management software to manage a compute environment, monitor for events, reserve resources such as memory, actuate triggers, and maximize the utilization of the resources in the environment according to required metrics. Where previously workload management software focused on generally managing jobs that are distributed into the environment, the present disclosure expands that use into data-centric searches and how to manage the compute environment in that context. FIG. 4 illustrates an example system embodiment 400 for managing searches. A workload manager 402 (or other software/hardware or other mechanism of managing the use of resources in the environment) at least in part manages the system. As the system accepts transactions or searches 404, a translation layer 406 maps the incoming transactions or searches to the appropriate resource in the memory space 408. In one example, a search engine may have a web crawling algorithm to gather data about webpages and store them in a database 408. As a user searches for a term or phrase such as in a search engine, the appropriate data in database 408 will be located so that the user can be directed to the websites that match the search term. As a spike in similar searches occurs, the workload manager 402 receives information that the same node, memory or set of nodes 412 are handling a high volume of transactions or hits on that data. The system can make a determination of high volume of transactions based on a threshold such as a service level agreement (SLA), number of tasks in the queue, hit rates per second, average response time, or based on any other data. The threshold can vary for different data-centric searches. For example, the system can consider one category of searches more important than others. In that case, the system assigns a lower threshold, for example an average response time of 0.2 seconds instead of 0.5 seconds, to the more important category in order to better service the important category. The categories can also be dynamic. For example, searches related to current events can be assigned via an SLA to have the shortest response time to best service the most popular searches. In one example, the system can change the threshold to trigger the approach disclosed herein if searches for the two presidential candidates have a response time of greater than 0.2 seconds the day after a debate. In this regard, the system can improve the response time for searches in a particular domain to improve the experience for the large number of users requesting searches in that domain.

Feature 412 represents the memory space 408 or data stored in memory locations distributed across a grid or cluster of computing devices. Feature 412 can be referred to as "hot data" when the data in a particular location or several memory locations is accessed many times in response to searches within the same domain. If a threshold event is met, then the workload manager 402 intelligently copies the hot data 412 into available or less needed memory locations 410 to create an expanded search space 410. The workload manager 402 can use reservations, triggers, provisioning, or any of the capabilities set forth in the incorporated applications to manage any of the processes and steps disclosed herein. The workload manager 402 has full knowledge of and control over the environment 408 and can control 422 and 424 the utilization of resources in the environment 408 using the various principles incorporated herein by reference. The workload manager 402 can also adjust the translation layer 406 to distribute similar data centric transactions 418, 420 over the original memory locations 412 and/or the expanded search space 410. The workload manager 402 can also manage the distribution of additional in-domain searches using other mechanisms as well besides using the translation layer. In this regard, FIG. 4 shows an initial group of searches 414 in which the compute environment responds by accessing data in memory locations 412. After the data is duplicated into new memory locations 410, then the workload manager 402 can manage additional searches in the same domain by accessing either the original memory locations 412, the new memory locations 410 or both.

After the data is duplicated and searches distributed, the system monitors events associated with the domain-specific searches, and if an event occurs or a threshold is passed, the system collapses the expanded search space such that searches submitted after the collapse or reduction event are processed by the search space in the database, removes duplicate data from one or more memory location or ceases to access one or more memory locations, and adjusts the algorithm to distribute processing amongst at least one remaining memory location. In other words, as the spike in similar transactions subsides, the workload manager 402 can reduce and even eliminate the data copies in the expanded search space 410 or cease to access the memory space storing the data. This reduction can occur gradually or all at once. The system can leave data copies in the expanded search space with an indication of importance or usage frequency. As trends in transactions and searches evolve, the workload manager 402 can identify hot data 412 that is more urgent than that currently in the expanded search space and replace it. In one aspect, different boxes shown in the memory space 408 can be part of the same physical computer. For example, the system can consider RAM, hard drives, flash memory, removable media, and, in a computer with multiple processor cores, the individual caches of each core as separate memory locations.

The workload manager 402 can also use a different approach to manage the searches. Again, it is noted that the search data may be search engine-indexed data, direct website data, or any other data such as a proprietary company database used for any kind of analysis such as speech processing, or weather reports and so forth. The system may distribute the data to other data storage such as cache, hard drives, tape drives, RAM, optical drives, or any future developed memory device. As discussed above, the data in the environment 408 is data obtained from a webcrawler and not data in a website itself. In another example, the data is website data per se. In some cases, the website may include streaming video. In this context, if an event threshold is met, such as many users accessing the same website, the system can duplicate either a part of all of the website data to a new location and the searching distribution algorithm can map searches to the additional locations. A system job or a trigger may be used to initiate the duplication of data into memory space 410 and then manage the distribution of in-domain searches amongst the various memory locations. The workload manager 402 may initiate a reservation of resources associated with the new memory locations 410. Other network resources may also have to be reserved and used to service the inquiries. Thus, CPUs, bandwidth, data pre-staging and post-staging jobs, etc. may all be utilized to achieve the steps disclosed herein. In one example, the system may only duplicate a video portion of a website rather than the more static portions. Thus, when users enter the URL or access the website, the delivered video may be streamed from either the original server or one of the dynamically reserved servers that now store the video for servicing the extra requests that the original server or servers alone could not handle to a sufficient level of performance.

As just noted, the principles described herein may also be applied to data centric searches other than web searches, such as local area network searches or other types of searches. The principles also extend to data centric transactions other than searches, such as web hosting. For example, a web hosting provider such as GoDaddy.com maintains a large cluster, grid, or cloud of computers in order to sell web hosting services. While a few web sites have sufficient traffic to fully or nearly fully utilize the resources of a hosting computer, the vast majority of web sites have sparse, sporadic traffic and are actually hosted on a shared machine with other customers. Occasionally a popular website such as CNN.com or Slashdot.org posts a link to a small website and diverts a large amount of web traffic to a modest server, without the resources to handle the surge rendering the server unable to process all the requests. The web hosting provider can provide a service applying the principles described herein to dynamically expand the web serving capacity of a website to a larger than usual group of computers. In this case, the event can be the number HTTP requests per second crossing a threshold or the amount of network traffic to a particular web server or address crossing a threshold. The system can duplicate the website and establish a number of new IP addresses for the new memory locations of the duplicated data. One example mechanism for accomplishing the redirection of URLs to different IP addresses may include the workload manager 402 or other mechanisms of rotating the IP address in DNS servers according to an algorithm as those discussed herein such that as more people request a particular URL, the DNS servers distribute the resolved IP addresses amongst at least one of the original IP address or the new IP addresses of the duplicated website or websites. As the event subsides (i.e., less people are requesting cnn.com), the system collapses the dynamically expanded group of duplicated websites back to the original size and original memory. As each duplicated website with a new IP address is collapsed or removed from availability, the algorithm will no longer insert that IP address into the DNS servers. As the collapse continues, only the original IP address would remain in the DNS server and future requests for that URL are served by the original web server. In this scheme, a web host can charge a flat monthly rate for such a service and spread expansion costs among many customers in a manner similar to insurance or the web host can charge based on actual costs associated with the expansion. Other variations and applications exist which will be apparent to one of skill in the art.

Figure 5:
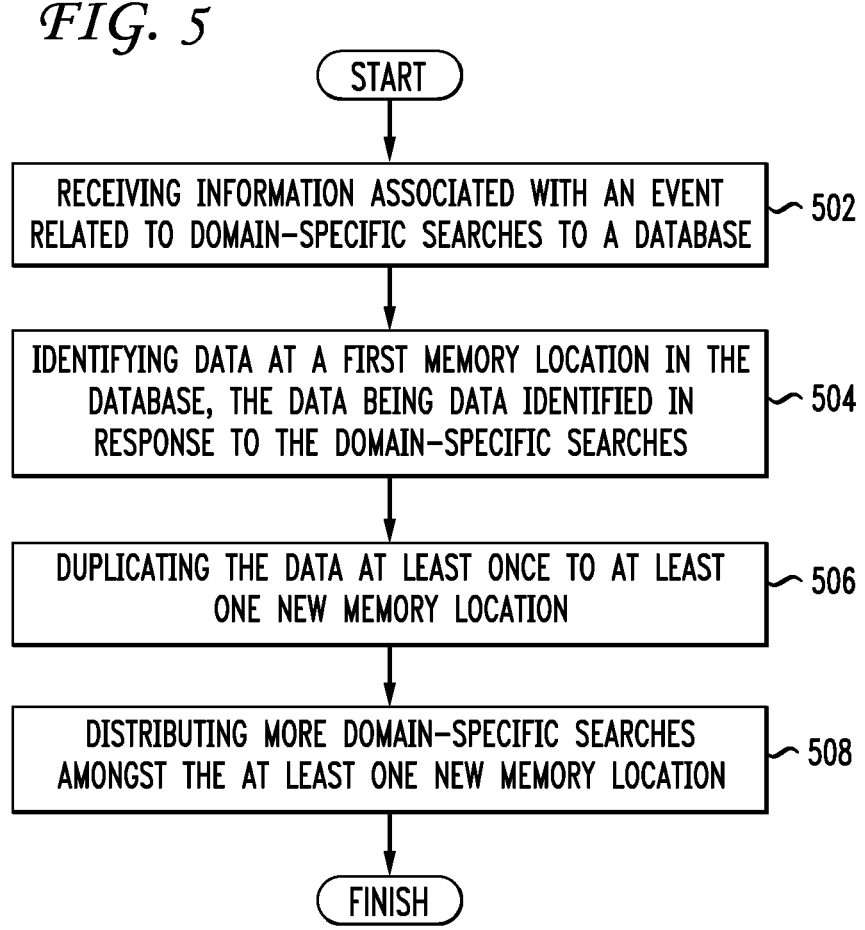
FIG. 5 illustrates an example method embodiment.

FIG. 5 illustrates an example method embodiment. The method embodiment is discussed in terms of a system configured to practice the method. The system can include components such as a workload manager and the like, one or more compute environments such as a cluster or grid of computers, on-demand center, cloud computing environment, and so forth, a network connecting the workload manager and the one or more compute environments, a database of search-related information in one location or distributed across multiple locations, any associated software, and other necessary components. The system receives information associated with an event related to domain-specific searches to a database (502). As an example, an Internet search engine can receive thousands of search queries each second which the search engine services by retrieving information from a search index. In this case, the event is the number of search queries within a particular domain per second. A search index is typically a large, distributed database, but can exist in a single location. The search engine maintains a log of search requests. The search engine can sort the log by search terms in order to determine which search terms or combinations of search terms have the highest hit rate or are the most popular. The system can monitor in any manner the hit rate, or other parameter associated with the environment to identify threshold that have been met. The system can receive all or part of the log as information associated with hit rates of searches to a database. In addition to high volume of searches, a trigger related to an SLA may indicate a minimum level of service for a particular category of search terms, or a search that completes in more than a certain amount of time (such as a search query for "Donald Trump" that takes longer than 0.7 seconds). The event may also not be related to hit rates. It can relate to energy consumption, temperature, events outside of the search of the environment such as current events, weather events, government action, economic events, and so forth.

Domain-specific searches include many layers of searches, depending on the desired quality of service. For example, an example of a domain-specific search is "Hurricane Katrina". While a few additional search terms can be incorporated as well, the majority of searches in that domain will include the phrase "Hurricane Katrina". Another example of a domain-specific search with multiple layers is Saint Patrick's Day. The domain is broad and can include search terms such as shamrock, green, leprechaun, pot of gold, March 17th, Ireland, pinch, parade, etc. The system can include all of these search terms and their variations in the domain-specific searches. Other example "events" include slow response time, high temperature at the domain-specific memory location, bandwidth issues, or a combination of factors that hits a threshold.

The system identifies data at a first memory location in the database, the data being data identified in response to the domain-specific searches (504). The system can identify data in response to the searches in numerous ways. For example, the system can identify data associated with the top 25 most popular searches or any search having more than 750 hits per second. The data is typically stored in one memory location or a limited number of memory locations which can effectively be referred to as one location. Memory locations include, for example, processor cache, RAM, solid-state drives, internal and external hard drives, and/or other media. In one node in a cluster, the data can reside on hard disk, in RAM, and in processor cache simultaneously. The identified data is the "hot data" that is the subject of many of the searches.

The system duplicates the data at least once to at least one new memory location (506). Consider for this example that data is associated with a domain-specific search for a recently announced sportscar. As hit rates increase for the sportscar, the system duplicates the data about the sports car to new memory locations on other computers or nodes. In one scenario where a single node can service a search request in 0.25 seconds, the system duplicates the data to enough nodes so that each node handles no more than 4 search requests per second. If incoming searches cross the desired service threshold, the system can reserve new memory locations accordingly. Service response time is only one factor of many when selecting the number of new memory locations. Other factors include location, cost, time to duplicate, available machines, competing domain-specific searches, service level agreements (SLAs), green computing, energy consumption, energy efficiency, etc. Other distribution scenarios exist for selecting the number of new memory locations.

The system distributes processing more or additional domain-specific searches amongst the at least one new memory location (508). An example algorithm for performing this task is roughly analogous to the translation layer 308, 406 shown in FIGS. 3 and 4, but the primary difference is that a workload manager can update the algorithm intelligently and dynamically to respond to spikes in similar data-centric transactions. Once the data is in multiple locations, the system applies an algorithm to distribute searches across the multiple locations. The system can randomly distribute processing of searches amongst all memory locations or distribute them serially or based on other criteria. More sophisticated implementations of the algorithm can distribute processing of searches to memory locations with the least load, least wait time, most efficient processing, the coldest temperature, the cheapest processing, or other network and/or memory location characteristics. The algorithm can vary based on time of day, quality of service constraints, competing domain-specific searches, cost, and so forth.

While the number of searches remains high, the system will maintain the expanded search space and continue to distribute searches amongst at least part of the expanded search space and the original search space. In time, the demand for searches in a particular domain may be reduced or some other event may affect the need for the expanded search space. In order to shrink the number of memory locations or the search space, the system optionally identifies a reduction event related to the domain-specific searches (510) and collapses the expanded search space such that searches for the key data are processed with data in a reduced search space smaller than the expanded search space but having at least one memory location (512). In the sportscar example, if the buzz dies down around the sportscar after the manufacturer reveals that it gets a maximum of 3 miles per gallon, assume that searches for the sportscar sharply taper off. When searches drop below a certain threshold, the system collapses the expanded search space by deleting the data in all or some of the new memory locations or controlling the algorithm to no longer include those memory locations in the distribution. The system can do this in one step or gradually with a series of steps. The first memory location can act as a parent of all the new memory locations and can be uncollapsable, but in one aspect, collapsing the expanded search space is not limited to preserving the original memory location so long as at least one location still contains the key data. For example, the system duplicates the original memory location at address 0x0012 to memory locations 0x0A29, 0xC3F0, and 0x82D2, each of which can be in a different computer. The system can collapse 0x0012 first, even though it is the original memory location. The workload manager can intelligently decide which memory location is best suited for collapsing first. This may be based on time (i.e., which time zone still likely has people awake), or geography, etc. The system can collapse the expanded search space by removing any of the memory locations in any order.

In one variation, the system further organizes hit rates by network segment, identifies a network segment associated with searches for the key data, and duplicates the key data to at least one new memory location in close proximity to the identified network segment. The system can measure proximity by geographic distance, network latency, number of intermediate network hops, cost, and/or other factors. For example, if key data relates to the Green Bay Packers and most searches originate in Wisconsin, then the system identifies network connections between the compute environment and Wisconsin as key network segments. The system duplicates key data regarding the Green Bay Packers as close to the key network segment as possible. For example, if the compute environment does not include any nodes in Wisconsin, then the system can duplicate the key data to memory locations in Chicago and/or Minneapolis and manage any memory provisioning of nodes and network paths to enable capabilities to provide short response times per an SLA or other requirement. Or, for example, if the network path with the least latency to Wisconsin is from Des Moines, the system can duplicate the key data to memory locations in Des Moines and provision nodes and other network resources in a similar manner.

Figure 6:
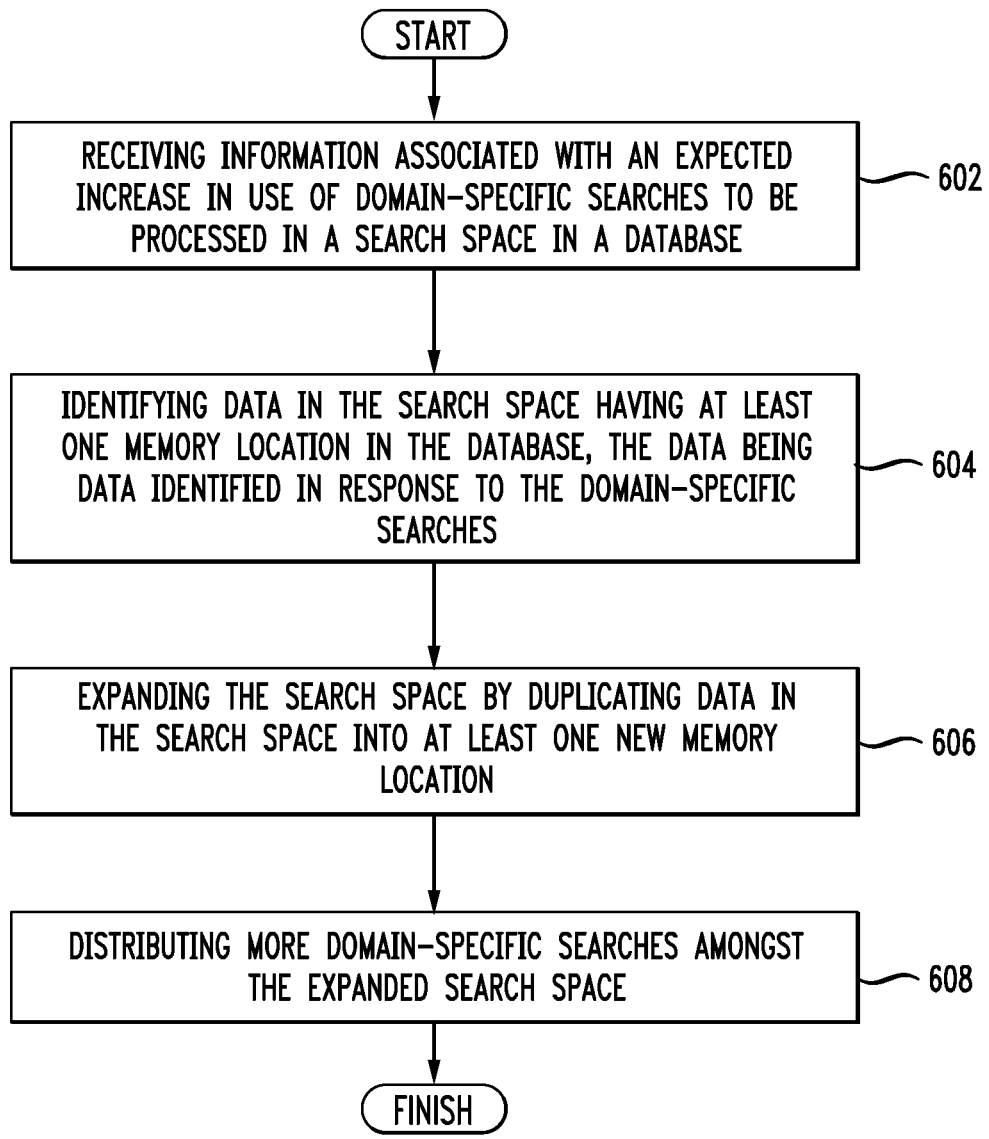
FIG. 6 illustrates an example method for predictively managing searches.

FIG. 6 illustrates an example method for predictively expanding search space in a data centric search environment. A system can predictively expand a search space by receiving information associated with an expected increase in use of a search phrase or searches specific to a particular domain to be processed in a search space in a database (602), identifying data in the search space having at least one memory location in the database, the data being data identified in response to the domain-specific searches (604), expanding the search space by duplicating data in the search space into at least one new memory location (606) and distributing more or additional domain-specific searches amongst the expanded search space (608). In other words, searches that are received after the duplication of the data are then distributed amongst at least the ne expanded search space and preferably including the original search space as well. Information regarding an expected increase in use of a search phrase can be as simple as compiling a list of upcoming summer movies and responding to the expected increase in Internet searches for each upcoming movie. The number of duplicated memory locations can correlate with the each movie's previews and expected box office performance, for example. In the case of an election where 10 individuals are competing for a nomination for candidacy, the system can predictively expand the search space for each of the 10 individuals in the weeks before the nomination.

One example way of identifying domain-specific data is through a special administrative search field. An administrator may have a google search field such that the data that is retrieved is identified as hot data and immediately duplicated as disclosed herein. Then, the administrator can be watching the Olympics and type in "Michael Phelps 400M video" and the responsive data is therefore identified as hot data and processed accordingly. This can be done manually as above or automated.

Prediction based on new website data may also be used. For example, web crawling algorithms can analyze websites and data obtained therefrom. If new websites have recently been deployed or built that can be identified in a particular domain, then the system can act to prepare extra indexed data as set forth herein to manage predicted searches to those websites. In another example, the system may analysis blogs to identify topics or terms that are gaining traction and predictively prepare for additional searches on those topics or terms.

Often, searches for key data are cyclical. Cyclical searches can occur on a daily, weekly, monthly, yearly, or other period. For example, searches for Santa Clause spike annually during December, searches for news spike daily in the morning hours on weekdays, and searches for the magicicada spike every 13 or 17 years in different regions. In order to address these cyclical searches, the system can further store received information in a log organized by date and time, predict a schedule of expected increases based on the log, and expand the search space based on the predicted schedule.

As noted above, the data that may be searched is any data. In one aspect, the data is indexed data that is obtained from crawling and indexing websites. In another aspect, the data is the website itself. In that case, the system may identify an event such as response time or hit rates to a certain website and dynamically duplicate the website itself such that the requests for the particular URL are distributed to at least one new memory location. The collapse may occur, for example, by modifying (i.e., shrinking or shortening) a reservation for those resources thus making them available for other workload. This may be helpful if there are too many requests for a streamed video presentation at a website, for example, and additional servers are necessary to manage the requests. In this case, not only may data be copied into new memory locations but additional servers, CPU's, bandwidth and so forth may be provisioned and/or allocated to manage the searches/requests. The workload manager can handle and manage within the compute environment all of these provisioning/resource reservation and allocation requirements per the various principles of the incorporated applications. For example, the manager can reserve a set of CPU's, perhaps re-provisioning an appropriate operating system on the nodes (say from Microsoft Windows to Linux), copy the data into cache, and initiate triggered jobs to begin streaming video data from the new nodes to additional search requests from users.

The compute environment mentioned herein may be any utility computing, cluster, grid, cloud computing environment, on-demand center, server farm, and so forth. The workload manager of the present disclosure can be configured to manage searches for data in any type of computing environment. Therefore, whether the data is web crawled index data, website data per se, or any other type of database, the principled disclosed herein can improve the search times and service response for inquiries or searches into such databases.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to text, image, audio, or movie searches on the Internet or an internal network. One of skill in the art will recognize that the principles described herein may be modified to apply to searches for images, speech, audio, video, multimodal searches, etc. As the number of processor cores increases and their associated caches increase in personal computers, the same principles may even be applied to a single desktop computer. Those skilled in the art will readily recognize various modifications and changes that may be made to the present invention without following the example embodiments and applications illustrated and described herein, and without departing from the true spirit and scope of the present invention.

I claim:

1. A method comprising:
   identifying, at a first time, data at a memory location in response to topic-specific searches;
   duplicating the data to a new memory location, wherein the memory location and the new memory location comprise an expanded search space;
   responding, at a second time which is later than the first time, to a first topic-specific search using the data in the new memory location;
   identifying a reduction event related to the topic-specific searches;
   collapsing, after the reduction event, the expanded search space to yield a reduced search space; and
   responding to a second topic-specific search using data in the reduced search space.

2. The method of claim 1, wherein responding to the first topic-specific search further comprises responding using the data at the memory location.

3. The method of claim 1, wherein the new memory location is selected at random.

4. The method of claim 1, wherein the new memory location is selected serially.

5. The method of claim 1, the method further comprising:
   organizing multiple events by network segment; and
   identifying a network segment associated with the topic-specific searches, wherein the new memory location is in close proximity to the network segment.

6. The method of claim 5, wherein a distance between the new memory location and the network segment is measured by at least one of geographic distance, network latency, number of intermediate network hops, temperature, and cost.

7. The method of claim 1, wherein a workload manager manages at least part of identifying data, duplicating the data, and responding.

8. A method comprising:
   receiving information, at a first time, associated with an expected event related to topic-specific searches to a database;
   identifying data in a search space having a memory location in the database in response to the topic-specific searches;
   expanding the search space by duplicating data in the search space into a new memory location, to yield an expanded search space;
   distributing, at a second time which is later than the first time, an additional topic-specific search amongst the expanded search space;
   monitoring for a reduction event associated with the topic-specific searches, to yield an identified reduction event; and
   based on the identified reduction event, collapsing the expanded search space such that searches submitted after the identified reduction event are processed by a remaining memory location.

9. The method of claim 8, the method further comprising:
   storing received information in a log organized by date and time;
   predicting a schedule of expected events based on the log; and
   expanding the search space and distributing topic-specific searches amongst the search space in advance of expected events based on the schedule of expected events.

10. The method of claim 8, the method further comprising:
    identifying a network segment associated with the expected event related to topic-specific searches; and
    duplicating the data to a new memory location in close proximity to the network segment.

11. The method of claim 10, wherein the proximity is measured by at least one of geographic distance, network latency, number of intermediate network hops, temperature, and cost.

12. The method of claim 8, wherein the method is processed by a workload manager.

13. A system comprising:
    a processor; and
    a computer-readable storage medium storing instructions which, when implemented by the processor, cause the processor to perform operations comprising:
       identifying, at a first time, data at a memory location in response to topic-specific searches;
       duplicating the data to a new memory location, wherein the memory location and the new memory location comprise an expanded search space;
       responding, at a second time which is later than the first time, to a first topic-specific search using the data in the new memory location;
       identifying a reduction event related to the topic-specific searches;

collapsing, after the reduction event, the expanded search space to yield a reduced search space; and responding to a second topic-specific search using data in the reduced search space.

14. The system of claim 13, wherein the operations further comprise responding using the data at the memory location.

15. The system of claim 13, further comprising a workload manager module.

16. A non-transitory computer-readable medium storing instructions which, when executed by a processor, cause the processor to perform operations comprising:

identifying, at a first time, data at a memory location in response to topic-specific searches;

duplicating the data to a new memory location, wherein the memory location and the new memory location comprise an expanded search space;

responding, at a second time which is later than the first time, to a first topic-specific search using the data in the new memory location;

identifying a reduction event related to the topic-specific searches;

collapsing, after the reduction event, the expanded search space to yield a reduced search space; and responding to a second topic-specific search using data in the reduced search space.

17. The non-transitory computer-readable medium of claim 16, wherein the operations further comprise a workload manager.

\* \* \* \* \*